No. 612,144. Patented Oct. 11, 1898.
A. SHARP.
PULLEY.
(Application filed Dec. 27, 1897.)
(No Model.)
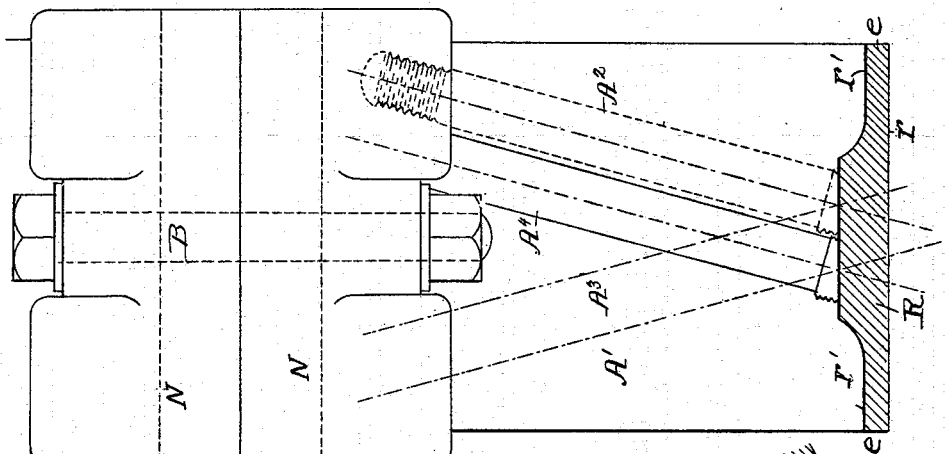
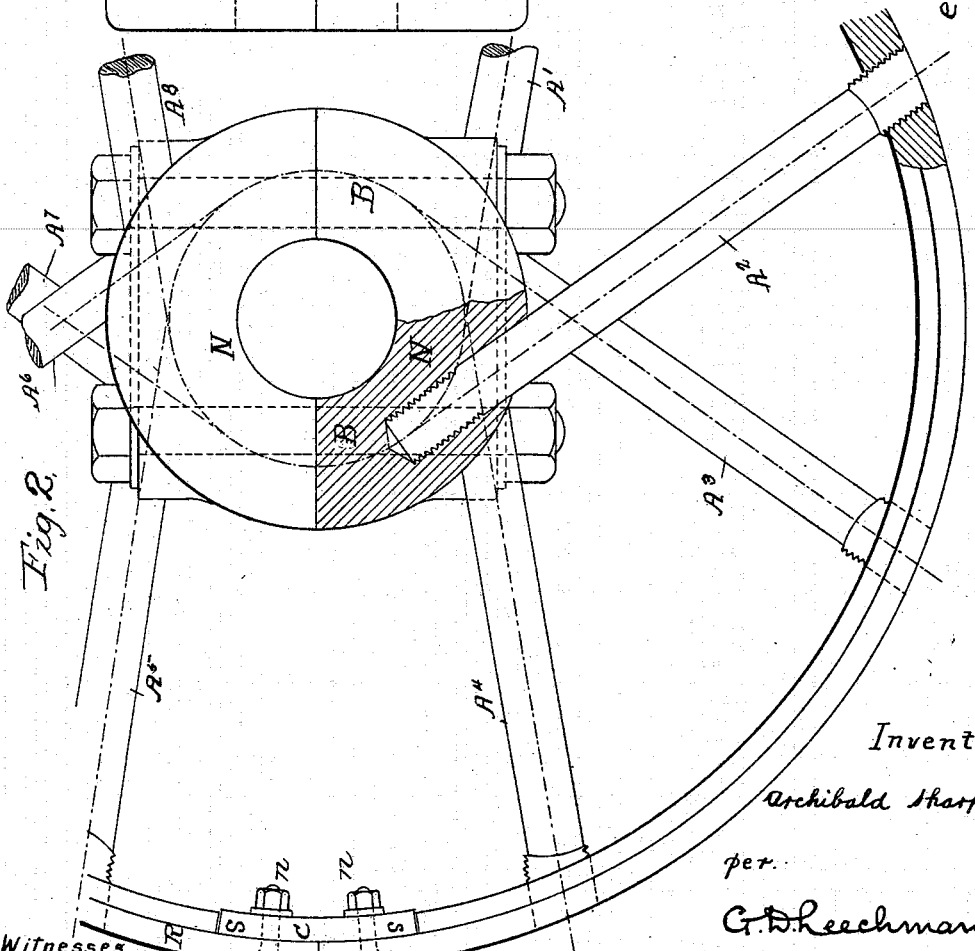
Witnesses
Thos. F. Wilson.
G. J. Fazakerley
Inventor.
Archibald Sharp.
per.
G. D. Leechman.
Attorney.

UNITED STATES PATENT OFFICE.

ARCHIBALD SHARP, OF LONDON, ENGLAND.

PULLEY.

SPECIFICATION forming part of Letters Patent No. 612,144, dated October 11, 1898.

Application filed December 27, 1897. Serial No. 663,758. (No model.) Patented in England October 10, 1896, No. 22,525.

*To all whom it may concern:*

Be it known that I, ARCHIBALD SHARP, a subject of the Queen of Great Britain, residing at Chiswick, London, in the county of Middlesex, England, have invented certain new and useful Improvements in Belt and Rope Pulleys with Wood Rims, (for which I have obtained a patent in Great Britain, No. 22,525, bearing date October 10, 1896,) of which the following is a specification.

My invention relates to belt and rope pulleys with wood rims; and it consists, essentially, in a rope or belt pulley comprising a rim made from a plank or planks of wood bent to the required curvature and having the ends secured by suitable means, a central hub, and tangent spokes adapted to resist a compressive strain, screwed by their outer ends into the said rim and by their inner ends into the said hub; and my invention further consists of certain details of construction, all being hereinafter described, and pointed out in the claims.

In the accompanying drawings, Figure I is an end view, partly in section, of a part of an eight-spoked split belt-pulley constructed according to my invention. Fig. II is a side view, also partly in section, of the same.

Similar letters refer to similar parts in both views.

The rim R of the flat-belt pulley is made from a straight plank or planks of wood planed approximately to the required section and then steamed and bent to the required curvature. The said rim may be of uniform thickness or may be made thicker in the middle $r^2$, where the spokes are screwed in, as shown. The edges $e$ and outer surface $r$ are turned true in a lathe after the pulley is built up.

In a pulley for rope-driving the rim may be made of two or more thicknesses of planks steamed and bent as above described and then glued together. The grooves for the ropes are turned in a lathe after the pulley is built. The ends of the wood rim abut against each other and may be fastened by a suitable dovetail or other joint; but for a split pulley I prefer to employ a cover-plate C, of metal or wood, on the inner surface of the rim, to which the said abutting ends may be secured by screws $s$ with lock-nuts $n$. The inner surfaces $r'$ of the rim may be turned true before the cover-plates are fixed, and the central ridge $r^2$ is preferably removed near the ends to provide a suitable bed for the said cover-plate. The cover-plate may be permanently fastened to one portion of the rim, if desired.

The nave or hub N may be of iron, wood, compressed paper, wood-pulp, or other suitable homogeneous material, and in the case of a split pulley is made in two parts fastened together by bolts and nuts B.

The tangent spokes or arms A may be of wood, metal tube, or other material suitable for resisting a compressive stress, and are so placed that their centers all lie at the same distance from the center line of the shaft. The ends $a$ of the spokes are screwed into the nave and are made smaller than the ends $a'$ which are screwed into the rim, so that the former, $a$, may pass freely through the holes tapped for the latter, $a'$. The spokes are screwed simultaneously to the rim R and to the nave N, the screw-threads at the respective ends of the spokes A being of the same pitch. The mouths of the holes in the nave are made plain to fit tightly the bodies of the spokes.

To facilitate the building of the pulley, the angle between the spoke and the rim, both longitudinally and transversely, is preferably the same for all. There are four series of spokes at different distances from the face of the nave, as shown diagrammatically at $A'$ $A^2$ $A^3$ $A^4$, Fig. 1. One half of the spokes $A'$ $A^3$ $A^5$ go toward one end of the nave, and the alternate spokes $A^2$ $A^4$ $A^6$ toward the other end thereof. The spokes are thus grouped in sets of four in the front elevation, Fig. 2. The plane of division of the rim and nave should pass between adjacent sets of spokes, so that the pulley may be split without detaching the spokes from the nave and rim. The number of spokes in a symmetrical split pulley is therefore a multiple of eight.

What I claim as my invention, and desire to secure by Letters Patent, is—

1. In a separable rope or belt pulley, the combination of a divided rim, means for securing the parts of the said rim, a divided hub, means for securing the parts of the said hub, there being large tapped spoke-holes in the rim, and small tapped spoke-holes in the hub, and tangent spokes, larger at their outer ends than their inner ends and threaded at each end, whereby they may be simultaneously screwed into the hub and rim, all substantially as set forth.

2. In a separable rope or belt pulley, the combination of a divided rim made from bent wood, means for securing the parts of the said rim, a divided hub, bolts to secure the parts of the hub, tangent spokes screwed by their large outer ends into the said rim and by their small inner ends into the said hub, one half of the spokes going toward one end of the hub and the other half of the spokes going toward the other end of the hub, and the spokes as a whole being grouped in sets of four in front elevation, all substantially as set forth.

ARCHIBALD SHARP.

Witnesses:
GEORGE ARTHUR BURLS,
A. S. E. ACKERMANN.